May 28, 1963 G. HIRS 3,091,336
FILTER APPARATUS
Filed March 27, 1961 2 Sheets-Sheet 1
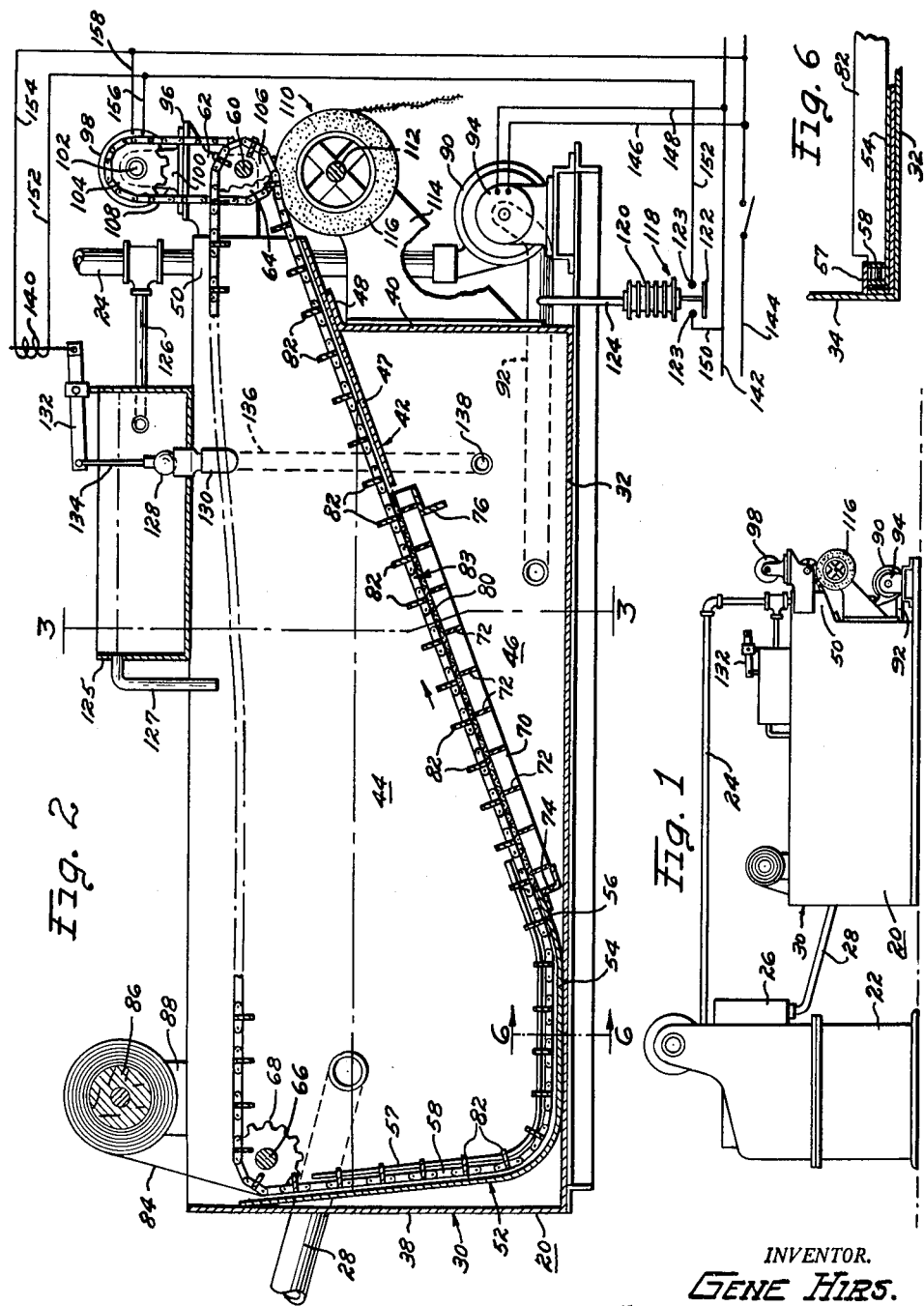
INVENTOR.
GENE HIRS.
BY
ATTORNEY.

May 28, 1963 G. HIRS 3,091,336
FILTER APPARATUS
Filed March 27, 1961 2 Sheets-Sheet 2
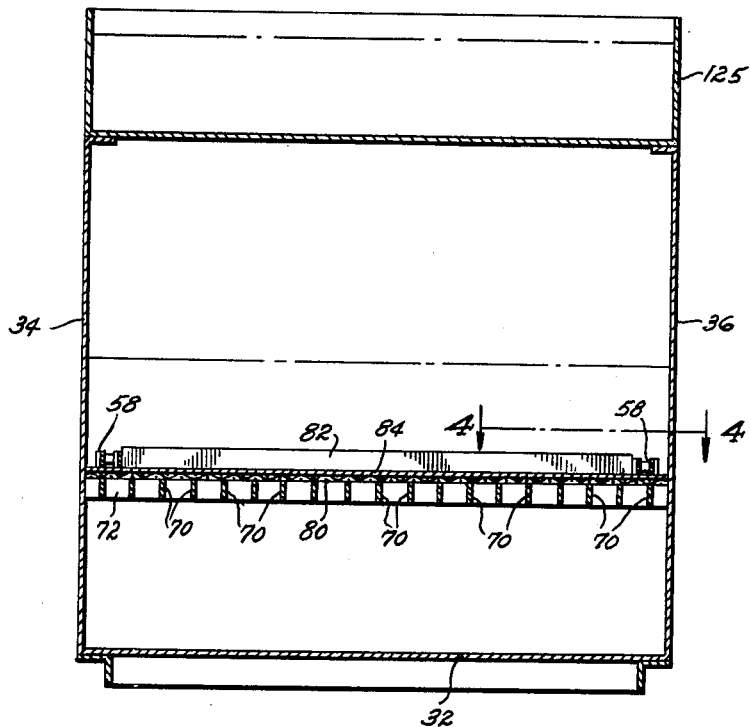
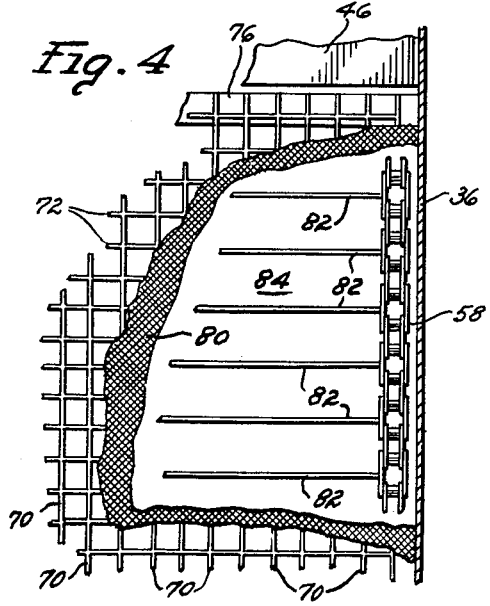
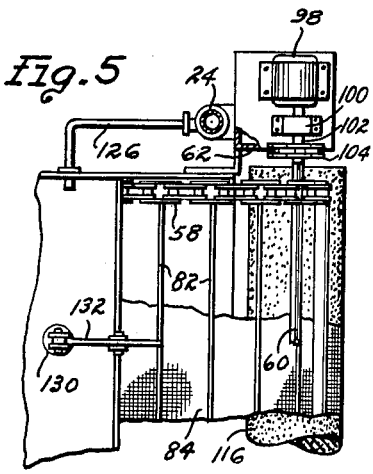
INVENTOR.
GENE HIRS.
BY
ATTORNEY.

United States Patent Office 3,091,336
Patented May 28, 1963

3,091,336
FILTER APPARATUS
Gene Hirs, 17208 Greenview Road, Detroit, Mich.
Filed Mar. 27, 1961, Ser. No. 98,498
3 Claims. (Cl. 210—111)

This invention relates generally to filter apparatus and particularly to liquid filter apparatus.

This is a continuation-in-part of my copending application filed September 23, 1959, Serial No. 841,874, for Filter Apparatus, now abandoned.

The principal object of my invention is to provide an improved liquid filter apparatus.

Another object of my invention is to provide an improved liquid filter apparatus of the type in which a belt-like filter media is carried down and through a tank of liquid to be filtered and moved along a path of travel against opposing pressure forces over a filter outlet and out of the tank without need for positive attachment of the media to its drive means.

Another object of the invention is to provide a filter apparatus of the above mentioned character in which the filter media can be readily disposable since it is not positively attached to its drive mechanism and yet will not normally slip relative thereto.

More specifically, it is an object of the invention to provide in connection with the filter media drive mechanism, a resilient pressure roll cooperable with the drive means to insure positive movement of the filter media along its path of travel.

Another object of the invention is to provide a suction pump on the outlet side of the media to enhance the filtering operation, and to prevent the creation of a vacuum when the media becomes clogged so as to avoid the accompanying drag on the travel of the media.

Another object of the invention is to provide a filter apparatus of a structural character having a fixed filter media and provisions for automatically cleaning the media in response to a clogged condition thereof.

Another object of the invention is to provide an inexpensive liquid filter apparatus of the above mentioned character.

Other objects of the invention will become apparent from the following detail description taken in connection with the accompanying drawings in which:

FIG. 1 is a side elevation of a machine and my filter apparatus;

FIG. 2 is an enlarged vertical sectional view of the filter apparatus shown partly in elevation;

FIG. 3 is a cross sectional view, taken along line 3—3 of FIG. 2;

FIG. 4 is a fragmentary horizontal sectional view, taken along line 4—4 of FIG. 3 and showing certain parts in plan;

FIG. 5 is a fragmentary plan view of the apparatus; and

FIG. 6 is a fragmentary sectional view, taken along line 6—6 of FIG. 2.

Referring to the drawings by characters of reference, in FIG. 1 my filter apparatus, designated generally by the numeral 20, is shown in operative association with a machine 22 that is representative of the class of tool driving machines requiring the delivery to the tool (not shown) of a clean coolant or cutting oil. Clean coolant is supplied to the tool from the filter apparatus 20 by way of a supply pipe 24 and the liquid drains into a sump 26 which is mounted on the back of the machine 22. From the sump 26, the now dirty liquid containing metallic particles and other foreign matter is returned by gravity to the filter apparatus 20 by way of a return pipe 28.

The filter apparatus 20 includes a tank 30 of rectangular shape, as seen in plan, having a bottom wall 32, side walls 34 and 36, and end walls 38 and 40. An inclined partition or ramp 42 divides the interior of the tank into an upper inlet chamber 44 for liquid to be filtered and a lower outlet chamber 46 for the filtered liquid. The ramp 42 is sectionally constructed and includes an upper wall member 47 that seats on end wall 40 and extends to the opposite side walls 34 and 36 of the tank. Preferably the wall member 47 is welded to the upper flanged edge 48 of tank end wall 40 and to the opposite side walls 34 and 36. The upper end portion of the wall member 47 projects externally of the tank above end wall 40 as do also, adjacent end portions 50 of the tank side walls 34 and 36.

Within the tank 30 and adjacent end wall 38 there is a guideway that includes a sheet metal wall member 52 that extends entirely across the tank 30 and is preferably welded at opposite side edges to the tank. The wall member 52 extends downwardly at an acuate angle to tank end wall 38 and adjacent the bottom of the tank curves away from end wall 38 having a horizontal portion 54 which has an upwardly bent portion 56 that is coplanar with and forms a part of the ramp 42. In parallel spaced relation to the wall member 52 are sheet metal strips 57 which are welded respectively to the opposite tank side walls 34 and 36 and which cooperate with wall members 52 to provide channel-like guideways respectively for a pair of endless chains 58.

Outwardly of the upper end of the ramp 42, a drive shaft 60 is rotatably mounted on brackets 62 that are welded or otherwise secured to the side wall portions 50 of the tank, and fixed to the shaft 60, are a pair of driven sprockets 64 that drive the chains 58. At the other end of the tank 30 above and adjacent the inlet to the chain guideways, a transverse driven shaft 66 is fixed to the opposite tank side walls and on shaft 66 are spaced sprockets 68 about which the chains 58 travel, the sprockets guiding the chains 58 down into the guideway between wall member 52 and guide strips 57.

Interposed in the ramp 42 between the fixed wall members 47 and 56 is a grate structure including longitudinally extending parallel grate members 70 and similar transversely extending grate members 72. The grate structure extends substantially to the opposite side walls 34 and 36 of tank 30 and is supported along its lower end on a Z-shaped cross member 74 and along its upper end on an angle cross member 76. The cross members 74 and 76 are welded to the opposite tank side walls 34 and 36 and provide a seat on which the grate structure is loosely supported such that the grate structure may be readily removable by merely lifting it upwardly out of the tank. Fixed to and overlying the upper edges of the grate members 70 and 72 is metal screening 80 which is substantially in the inclined plane of the ramp 42 and forms a liquid pervious part of the ramp.

The chains 58 are of conventional link construction and are connected together by cross members or flights 82. Preferably the flights 82 are welded at their opposite ends to corresponding ones of the outer links of the chains, as shown. The chains 58 and connecting flights 82 provide a liquid pervious guide belt, designated generally by the numeral 83 for guiding an elongated sheet of filter media 84 down into the tank of contaminated liquid in compartment 44 substantially to the bottom thereof and then up the ramp 42 over the screening 80. The filter media 84 is preferably an inexpensive paper media that is rolled off of a spool 86, supported by suitable brackets 88 mounted on opposite side walls 34 and 36 of the tank.

A pump 90, preferably of the rotary type, operates continuously to withdraw clean liquid from the outlet chamber 46 and thus force flow of liquid from chamber 44 through the filter media that overlies the screening 80 into chamber 46. The pump 90 has its suction inlet connected by a pipe 92 to the chamber 46 and has its outlet connected to the supply pipe 24 which, as previously mentioned, delivers the liquid to the tool of machine 22. A suitable electric motor 94 drives the pump 90.

Mounted on a platform 96 of one of the brackets 62 there is an electric motor 98 which is normally deenergized, but is connected to drive the chains 58 through a suitable speed reduction device 100, as illustrated in FIG. 5. The speed reduction device 100 has a drive shaft 102 on which is fixed a sprocket 104, and fixed on the lower shaft 60 there is a similar sprocket 106, as shown in FIG. 2, which is driven from sprocket 104 by a chain drive 108.

In order to hold the filter media 84 to the belt 83 against slippage and also so that the filter media is not physically connected to the belt and thus can separate therefrom for disposal of the media and dirt thereon, I provide a large diameter roller 110 which cooperates with the belt 83 to tightly grip the filter media therebetween at the feed end of the belt. The roller 110 is arranged with its axis extending transversely of the belt 83, and the periphery of the roller against the underside of the lead side of the belt. The roller 110 has a shaft 112 fixed thereto on which the roller is freely rotatable, the shaft being journaled in a pair of oppositely disposed brackets 114 that may be welded to the tank end wall 40. Covering the spool of the roller 110 is an outer covering 116 fixed thereto, which is of resilient material, such as sponge rubber. The roller 110 is arranged such that the underside of the belt chains 58 and flights 82 displace the resilient surface covering 116 of the roller 110, thus frictionally gripping the filter media 84 to move with the belt against the pressure of the liquid in the upper chamber 44.

A control or pressure responsive switch 118 controls operation of the belt driving motor 98 to start the motor when clogging of the filter media 84 over the screening 80 reaches the degree where filtering becomes inefficient which is indicated by a predetermined decrease in pressure in the outlet chamber 46. The pressure responsive switch 118 is diagrammatically illustrated as comprising a sealed bellows 120 having a movable end wall carrying a contact 122 that is cooperable with fixed contacts 123 to close the circuit of motor 98. The fixed end of the bellows 120 is connected to the suction pipe 92 by a tube 124 and thus the switch 120 responds to changes in the pressure within the filter outlet chamber 46. Normally, the switch 118 is open as shown or until the pressure in chamber 46 decreases to a predetermined pressure for which the switch is set to close. The pressure responsive switch 118 may be of the type having a low pressure limit at which the switch will close and a high pressure limit at which the switch will open or delayed action so as to maintain operation of the conveyor for a corresponding interval.

As it is desirable that the pump 90 be operated continuously so as to continuously deliver coolant to the tool of machine 22, it will be seen that the increasing pressure differential developing as the filter media 84 clogs could reach a point where it would impede movement of the filter media 84 with the belt 83, particularly if all of the liquid in chamber 46 is removed by the suction pump down to the intake of pipe 92. To avoid this, I arrange the intake of pipe 92 adjacent the bottom of chamber 46 and provide for adding some of the filtered liquid to chamber 46 from a second tank 125. The rate of supply of liquid to the chamber 46 from the tank 125 is less than the rate of removal of liquid from chamber 46 by suction pump 90 so that the pressure in chamber 46 will not be raised to the pressure that would cause pressure responsive switch 118 to open. As shown, the tank 125 may extend between and be mounted on the upper side edges of the filter apparatus tank 30. A by-pass pipe 126 connected into supply pipe 24 delivers clean coolant into the tank 125, the level of the liquid in tank 125 being kept substantially constant by the provision of an overflow pipe 127. The overflow pipe 127 is arranged to drain overflowing coolant into the upper chamber 44 of the filter tank 30. In the bottom of tank 125 there is an outlet which is normally closed such as by a ball valve 128 that engages the seat of an outlet valve body 130. An operating lever 132, pivoted on the tank 125 is connected to the ball valve 128 by a rod 134 and is pivotal to raise the ball valve from its seat to allow the coolant in tank 125 to descend into chamber 46 to prevent a vacuum occurring in the chamber. A pipe 136 connected to the valve body 130 passes out of tank 30 and then extends down and discharges as at 138, into the chamber 46. A normally deenergized solenoid 140 is connected to the valve operating lever 132 to raise the ball valve 128 and is under the control of the pressure responsive switch 118.

The numerals 142 and 144 designate the main lines of an electric power source and across the lines 142 and 144 are connected the terminals of the pump motor 94 by conductors 146 and 148. A lead 150 connects one of the pressure switch contacts 123 to main line 142 and the other of the contacts is connected by a lead 152 to solenoid 140 which is connected to the other main line 144 by a lead 154. Leads 156 and 158 connect the belt driving motor 98 in parallel with the solenoid 140.

*Operation*

In operation when the line switch is closed, the motor 94 will be energized to drive the rotary pump 90 and will continue to drive the pump until the line switch is opened. The pump 90 withdraws filtered or clean coolant from the outlet chamber 46 and delivers the coolant through supply pipe 24 to the tool of machine 22 where the coolant now contaminated with metal chips and other foreign matter drains from a sump 26 through the return pipe 28 into the upper chamber 44 of the filter apparatus. Some of the coolant flows through the by-pass 126 into the tank 125 wherein the overflow pipe 127 maintains a quantity of liquid in the tank. As circulation of the coolant continues, the foreign matter filtered therefrom collects on the upper surface of the filter media 84, particularly that portion of the media overlying the screening 80, and decreases the filter rate with accompanying decrease in pressure within the outlet chamber 46. When the pressure within the outlet chamber 46 decreases to a predetermined pressure, the pressure responsive switch 118 closes its contacts 123 which energizes both the belt-driving motor 98 and the solenoid 140. When this occurs, the belt 83 is driven in the direction of the arrow and the resilient roller 110 acts against the underside of the filter media 84 holding the media to the belt. The roller 110 is rotated by the belt 83 and the filter media and foreign matter thereon rolls off of the roller preferably into a disposal container (not shown). At the same time that the belt 83 is driven, the solenoid 140 opens valve 128 which allows the filtered liquid in tank 125 to flow down through pipe 136 into the outlet chamber 46 to prevent the pump 90 from creating a vacuum in chamber 46 that would impede or place a drag on the filter media 84 in opposition to travel of the media with belt 83. As the belt moves up the ramp 42, and filter media 84 moves over the screening 80, the filter rate increases with corresponding decrease in the pressure differential of chambers 44 and 46. When the pressure increases above a predetermined pressure in chamber 46, switch 118 opens to stop the belt-driving motor 98 and also deenergizes the valve-operating solenoid 140. Deenergization of the solenoid 140 allows valve 128 to seat whereupon the tank 125 again fills to the overflow level from the by-pass 126.

From the foregoing detail description it will now be understood that I have provided an improved filter apparatus in which a continuous filter media is guided down into a liquid filter chamber, through the chamber and up a filtering ramp and out of the chamber. This is accomplished by the provision of a resilient roller without physically attaching the filter media to the guide belt, the roller and guide belt cooperating to hold the media frictionally to the belt such that the media may run off of the belt at the discharge end thereof for disposal purposes. In addition, I have provided for the continuous operation of a suction pump that withdraws filtered liquid from an outlet chamber without creating a vacuum therein which would place an undersirable drag on movement of the filter media with the guide belt.

I claim:

1. In a filter apparatus including a tank, a wall within and dividing said tank into an upper inlet chamber for liquid to be filtered and a lower outlet chamber for filtered liquid, said wall having an opening therein establishing communication between said inlet chamber and said outlet chamber, a liquid-pervious support carried by the wall at said opening, a liquid-pervious looped belt having a lower portion disposed within said inlet chamber to travel along said wall over said support and a return portion overlying said inlet chamber, actuatable drive means for advancing said belt, a disposable sheet of filter media guided by said belt on the underside thereof down into said inlet chamber, along said wall, and out of said tank, the improvements of a pump having its inlet in communication with said outlet chamber to withdraw filtered liquid therefrom, control means responsive to a predetermined clogging of the filter media portion overlying said liquid-pervious support, means interposed between the outlet of said pump and the lower chamber for storing a reserve of liquid, a normally closed valve interposed between said storage means and said lower chamber, and means actuated by said control means in response to said clogged condition of said filter media (1) for opening said valve to introduce stored liquid into said lower chamber, thereby increasing the pressure in said lower chamber, and (2) for actuating said drive means to advance said belt and said media to position a fresh portion of said media over said liquid-pervious support.

2. In a filter apparatus as defined in claim 1, the further improvements of the control means being responsive to a decrease in pressure in said lower chamber, and said last-named means substantially simultaneously (1) opening said valve and (2) actuating said drive means.

3. In a filter apparatus including a tank, a wall within and dividing said tank into an upper inlet chamber for liquid to be filtered and a lower outlet chamber for filtered liquid, said wall having an opening therein establishing communication between said inlet chamber and said outlet chamber, a liquid-pervious support carried by the wall at said opening, a liquid-pervious looped belt having a lower portion disposed within said inlet chamber to travel along said wall over said support and a return portion overlying said inlet chamber, actuatable drive means for advancing said belt, a disposable sheet of filter media guided by said belt on the underside thereof down into said inlet chamber, along said wall, and out of said tank, and a pump having its inlet in communication with said outlet chamber to withdraw filtered liquid therefrom, the improvements of control means responsive to a predetermined clogging of the filter media portion overlying said liquid-pervious support, a storage receptacle receiving from the pump and storing a minor portion of the liquid previously withdrawn from the outlet chamber by said pump, means interconnecting said receptacle and said outlet chamber to accommodate drainage of stored liquid from said receptacle to said outlet chamber, and means actuated by said control means in response to said clogged condition of said filter media (1) for draining stored liquid into said outlet chamber to increase the pressure therein, and (2) for actuating said drive means to advance said belt and said media to position a fresh portion of said media over said liquid-pervious support.

References Cited in the file of this patent

UNITED STATES PATENTS

| | | |
|---|---|---|
| 2,665,812 | Crane | Jan. 12, 1954 |
| 2,675,129 | Doubleday | Apr. 13, 1954 |
| 2,851,163 | Anderson | Sept. 9, 1958 |
| 2,861,688 | Harms | Nov. 25, 1958 |
| 2,867,324 | Hirs | Jan. 6, 1959 |